(12) United States Patent
Kajita et al.

(10) Patent No.: US 9,053,734 B2
(45) Date of Patent: Jun. 9, 2015

(54) GLASS SUBSTRATE FOR INFORMATION RECORDING MEDIA AND INFORMATION RECORDING MEDIUM

(75) Inventors: Hiroshi Kajita, Osaka (JP); Hideki Kawai, Kobe (JP)

(73) Assignee: Konica Minolta Opto, Inc., Tokyo (JP)

(*) Notice: Subject to any disclaimer, the term of this patent is extended or adjusted under 35 U.S.C. 154(b) by 0 days.

(21) Appl. No.: 13/498,317

(22) PCT Filed: Sep. 6, 2010

(86) PCT No.: PCT/JP2010/065212
§ 371 (c)(1),
(2), (4) Date: Mar. 26, 2012

(87) PCT Pub. No.: WO2011/037001
PCT Pub. Date: Mar. 31, 2011

(65) Prior Publication Data
US 2012/0183812 A1 Jul. 19, 2012

(30) Foreign Application Priority Data

Sep. 28, 2009 (JP) ................................. 2009-222170

(51) Int. Cl.
| | |
|---|---|
| *G11B 5/73* | (2006.01) |
| *C03C 3/085* | (2006.01) |
| *C03C 3/087* | (2006.01) |
| *C03C 3/091* | (2006.01) |
| *C03C 3/093* | (2006.01) |
| *C03C 3/095* | (2006.01) |
| *C03C 3/097* | (2006.01) |

(52) U.S. Cl.
CPC .............. *G11B 5/7315* (2013.01); *C03C 3/085* (2013.01); *C03C 3/087* (2013.01); *C03C 3/091* (2013.01); *C03C 3/093* (2013.01); *C03C 3/095* (2013.01); *C03C 3/097* (2013.01)

(58) Field of Classification Search
CPC ........ C03C 3/097; C03C 3/095; C03C 3/087; C03C 3/93; C03C 3/91; G11B 5/7315

USPC ........ 501/64, 66, 68, 56, 69; 428/846.9, 1.62; 360/135

See application file for complete search history.

(56) References Cited

U.S. PATENT DOCUMENTS

| | | | |
|---|---|---|---|
| 5,846,280 A | 12/1998 | Speit | |
| 6,306,786 B1 | 10/2001 | Koyama | |
| 2004/0063564 A1* | 4/2004 | Kawai et al. | .................... 501/69 |
| 2004/0186000 A1* | 9/2004 | Kawamoto et al. | ............. 501/69 |
| 2009/0162608 A1 | 6/2009 | Yagi | |

FOREIGN PATENT DOCUMENTS

| | | | | |
|---|---|---|---|---|
| JP | 83-21034 | 12/1996 | | |
| JP | 1998-67537 | 3/1998 | | |
| JP | 1999-302033 | 11/1999 | | |
| JP | 2000-128549 | 5/2000 | | |
| JP | 2001-76336 | 3/2001 | | |
| JP | 2009-280461 | * 3/2009 | ............. | C03C 3/083 |
| JP | 2009-280461 | * 12/2009 | ............. | C03C 3/083 |
| JP | 2010-1201 | 1/2010 | | |

OTHER PUBLICATIONS

Machine translation, JP 2009-280461 (Ohara), Dec. 2009.*
JP 2009-280461, Abstract, Ohara, Mar. 2009.*
JP 2009-280461, machine translation, Ohara, Mar. 2009.*
Japanese Office Action from corresponding Japanese Patent Application No. 2011-532951, dated Feb. 25, 2014.

* cited by examiner

*Primary Examiner* — Kevin M. Bernatz
(74) *Attorney, Agent, or Firm* — Brinks Gilson & Lione (57) ABSTRACT

Provided are a glass substrate for information recording media wherein air bubbles can be sufficiently removed, and an information recording medium using the glass substrate. The glass substrate contains 65 to 90 mass % of $SiO_2+Al_2O_3+B_2O_3$ (where $SiO_2$ is 45 to 75 mass %, $Al_2O_3$ is 1 to 20 mass %, and $B_2O_3$ is 0 to 8 mass %), 7 to 20 mass % of R2O (where R represents Li, Na, or K), 0.1 to 12 mass % of R'O (where R' represents Mg, Ca, Sr, Ba, or Zn), and 0.5 to 10 mass % of $TiO_2+ZrO_2$. Moreover, the glass substrate contains at least one multivalent element selected from among a group consisting of V, Mn, Ni, Mo, Sn, Ce, and Bi; the molar ratio of the total amount of the oxide of the multivalent element to the total amount of $TiO_2+ZrO_2$ is within the range of 0.05 to 0.50.

10 Claims, 1 Drawing Sheet

GLASS SUBSTRATE FOR INFORMATION RECORDING MEDIA AND INFORMATION RECORDING MEDIUM

This is a U.S. National Phase Application under 35 USC 371 of International Application PCT/JP2010/065212 filed on Sep. 9, 2010.

This application claims the priority of JP 2009-222170 filed Sep. 28, 2009, the entire content of which is hereby incorporated by reference.

TECHNICAL FIELD

The present invention relates to glass substrates for information recording media and information recording media, and in particular to a glass substrate for information recording media and an information recording medium using the same such as a magnetic disc.

BACKGROUND ART

In information recording media having a recording layer using the properties of magnetism, light, or magnetooptics, a typical one is a magnetic disc. Conventionally, aluminum substrates have been widely used as substrates for magnetic discs. However, in recent years, to meet the requirement for reduction in magnetic head levitation amount for increasing the recording density, more glass substrates are used because their surface is smoother than that of aluminum substrates and they has less surface defect.

In order to reduce surface defect of such glass substrate for information recording media, and thus to realize high-density recording, it is necessary to allow gas bubbles generated in a melting process of glass to remain in the glass substrate as few as possible, which gas bubbles have been produced in. Conventionally, there is typically used a method in which $As_2O$ or $Sb_2O_3$ is contained as a fining agent in the glass components to remove (fine) the gas bubbles in the molten glass (see Patent Document 1).

However, since $As_2O_3$ and $Sb_2O_3$ are toxic, use of these substances is becoming restricted in more occasions from the viewpoint of environment and human health. For this reason, studies have been done for a method for removing the gas bubbles in the molten glass without using $As_2O_3$ or $Sb_2O_3$ as a fining agent, and there is proposed a method in which the molten glass is decompressed to remove the gas bubbles (see Patent Document 2).

RELATED ART DOCUMENT

Patent Document

[Patent Document 1] Japanese Laid-Open Patent Application Publication No. H8-321034
[Patent Document 2] Japanese Laid-Open Patent Application Publication No. 2000-128549

SUMMARY OF INVENTION OR DISCLOSURE OF INVENTION

Technical Problem

However, in the method described in Patent Document 2, a complex process and a specific type of a reduced-pressure defoaming device are required, and change of the glass components tends to occur due to the volatilization of the glass components due to the decompression.

The present invention has been made in view of the above technical problems, and an object of the present invention is to provide a glass substrate for information recording media in which the gas bubbles can be sufficiently removed without adding As or Sb, and to provide information recording medium appropriate for use as an information recording medium.

Means for Solving the Object

To solve the above problems, the present invention includes the following features.

Item 1. A glass substrate for information recording media, comprising, with respect to all components of glass:
$SiO_2$, $Al_2O_3$, and $B_2O_3$, a total amount of which being 65% to 90% by mass
  where:
    the $SiO_2$ is 45% to 75% by mass;
    the $Al_2O_3$ is 1% to 20% by mass; and
    the $B_2O_3$ is 0% to 8% by mass;
$R_2O$, a total amount of which being 7% to 20% by mass
  where:
    R represents Li, Na, or K;
R'O, a total amount of which being 0.1% to 12% by mass
  where:
    R' represents Mg, Ca, Sr, Ba, and Zn;
$TiO_2$ and $ZrO_2$, a total amount of which being 0.5% to 10% by mass,
wherein the glass substrate for information recording media comprises at least one polyvalent element selected from a group consisting of V, Mn, Ni, Mo, Sn, Ce, and Bi, and
wherein a mole ratio, which is (a total amount of an oxide of the polyvalent element)/(a total amount of the $TiO_2$ and the $ZrO_2$), of the total amount of the oxide of the polyvalent element with respect to the total amount of the $TiO_2$ and the $ZrO_2$ is in a range of 0.05 to 0.50, assuming each of oxides of polyvalent elements as $V_2O_5$, $MnO_2$, $Ni_2O_3$, $MoO_3$, $SnO_2$, $CeO_2$, and $Bi_2O_3$.

Item 2. The glass substrate for information recording media of item 1, wherein a total amount of $Ln_xO_y$ is 0% to 5% by mass, where the $Ln_xO_y$ is at least one compound selected from a group consisting of a lanthanoid metal oxide, $Y_2O_3$, $Nb_2O_5$, and $Ta_2O_5$.

Item 3. The glass substrate for information recording media of item 1 or 2, wherein the polyvalent element includes at least one element selected from a group consisting of V, Mn, Sn, and Ce.

Item 4. The glass substrate for information recording media of item 3, wherein the polyvalent element includes Ce.

Item 5. The glass substrate for information recording media of item 1 or 2, wherein a content of each of the oxides of the polyvalent elements $V_2O_5$, $MnO_2$, $Ni_2O_3$, $MoO_3$, $SnO_2$, $CeO_2$, and $Bi_2O_3$ is 1% by mass or less with respect to the all components of glass.

Item 6. The glass substrate for information recording media of any one of items 1 to 5, wherein the components of glass includes neither As nor Sb.

Item 7. An information recording medium, comprising:
a recording layer on a surface of the glass substrate for information recording media of any one of items 1 to 6.

Advantage of the Invention

According to the present invention, since the mole ratio of the oxide of a predetermined polyvalent element, which functions as a fining agent in the glass, to the total amount of the $TiO_2$ and $ZrO_2$ in the glass components is limited in a predetermined range, the fining reaction of the polyvalent element caused by the change in valence can function effectively, and thereby sufficiently removing the gas bubbles without adding As or Sb. In addition, the glass substrate according to the present invention can be appropriately used as an information recording medium since it has characteristics that the amount of alkaline elution is low, that the thermal linear expansion coefficient is in a preferable range, and that a fracture toughness is high.

BEST MODE FOR CARRYING OUT THE INVENTION

The embodiment of the present invention is described in detail below, but the present invention is not restricted to the embodiments.

(Glass Composition)

A glass substrate for information recording media of the embodiment contains, with respect to all components of glass:

$SiO_2$, $Al_2O_3$, and $B_2O_3$, a total amount of which being 65% to 90% by mass
where:
the $SiO_2$ is 45% to 75% by mass;
the $Al_2O_3$ is 1% to 20% by mass; and
the $B_2O_3$ is 0% to 8% by mass;
$R_2O$, a total amount of which being 7% to 20% by mass
where:
R represents Li, Na, or K;
R'O, a total amount of which being 0.1% to 12% by mass
where:
R' represents Mg, Ca, Sr, Ba, and Zn;
$TiO_2$ and $ZrO_2$, a total amount of which being 0.5% to 10% by mass.

In addition, at least one polyvalent element selected from the group of V, Mn, Ni, Mo, Sn, Ce, and Bi is contained; and the mole ratio of the total amount of the oxide of the polyvalent element with respect to the total amount of $TiO_2+ZrO_2$ ((the total amount of the oxide of the polyvalent element)/(the total amount of $TiO_2+ZrO_2$)) is set within the range of 0.05-0.50, assuming each of the oxides of the polyvalent elements as $V_2O_5$, $MnO_2$, $Ni_2O_3$, $MoO_3$, $SnO_2$, $CeO_2$, and $Bi_2O_3$. Thus, the fining reaction caused by the change in valence of the polyvalent element can effectively function, thereby sufficiently removing the gas bubbles without adding As or Sb. In addition, the glass substrate according to the present invention can be used as an information recording medium since it has characteristics that the amount of alkaline elution is low, that the thermal linear expansion coefficient is in an appropriate range, and that the fracture toughness is high. The reasons for restricting the constituents in the range above are as follows.

$SiO_2$ is a constituent constituting the matrix of glass. If the content of the $SiO_2$ is less than 45% by mass, the glass structure is unstable, and thereby deteriorating the chemical durability and the molten state viscosity characteristics, with the result that formability is adversely affected. On the other hand, if the content is more than 75% by mass, the fusibility is low, and thus the productivity is low and the rigidity is not sufficient. As a result, the content of $SiO_2$ needs to be in the range of 45-75% by mass, and more preferably in the range of 50-72% by mass.

$Al_2O_3$, in the matrix of glass, stabilizes the glass structure and improves the chemical durability. If the content of $Al_2O_3$ is less than 1% by mass, the effect of stabilization is not sufficiently obtained. On the other hand, the content is more than 20% by mass, the fusibility is low, and thus the productivity is adversely affected. As a result, the content of $Al_2O_3$ needs to be in the range of 1-20% by mass, and more preferably in the range of 3-16% by mass.

$B_2O_3$ improves the fusibility and the productivity, and in the matrix of glass it stabilizes the structure of the glass and improve the chemical durability. If the content of $B_2O_3$ is more than 8% by mass, the molten state viscosity characteristics is bad, the formability is adversely affected, and the glass is unstable. As a result, the content of $B_2O_3$ needs to be in the range up to 8% by mass (including zero), and more preferably in the range up to 7% by mass (including zero).

The constituent of the total amount of $SiO_2$, $Al_2O_3$, and $B_2O_3$, which are skeletal components of glass, is less than 65% by mass, the glass structure is fragile, and instead if the total amount is more than 90% by mass, the fusibility and the productivity are low. As a result, the total amount of $SiO_2+Al_2O_3+B_2O_3$ needs to be in the range of 65-90% by mass, and more preferably in the range of 68-88% by mass.

Alkaline metal oxide $R_2O$(R represents Li, Na, or K) improves the fusibility and increases the thermal linear expansion coefficient. If the total amount of $R_2O$ is less than 7% by mass, the fusibility is not sufficiently improved and thermal linear expansion coefficient is not sufficiently increased. On the other hand, the total amount is more than 20% by mass, excessive alkaline substance is dispersed between the glass skeleton, and thus the amount of alkaline elution is increased and the chemical durability is decreased. As a result, the total amount of $R_2O$ needs to be in the range of 7-20% by mass, more preferably in the range of 8-18% by mass.

Containing one kind or more of R'O(R' represents Mg, Ca, Sr, Ba, or Zn) effectively improves the fusibility. MgO increases the rigidity and improves the fusibility, and CaO effectively increases the thermal linear expansion coefficient and the rigidity and improves the fusibility. SrO and BaO effectively increase the thermal linear expansion coefficient and improve fusibility. ZnO effectively increases the chemical durability and the rigidity and improves the fusibility. If the total amount of R'O is less than 0.1%, the fusibility of glass is not sufficiently improved, and if the total amount is more than 12% by mass, the glass structure is unstable and, the fusibility and the chemical durability are decreased. As a result, the total amount of R'O needs to be in the range of 0.1-12% by mass, and more preferably in the range of 1-10% by mass.

$TiO_2$ and $ZrO_2$ strengthen the glass structure and increase the rigidity. $TiO_2$ effectively strengthens the glass structure, increases the rigidity, and improve the fusibility. $ZrO_2$ effectively strengthens the glass structure, increases the rigidity, and improve the chemical durability. However, the total amount of $TiO_2+ZrO_2$ is less than 0.5% by mass, the glass structure is not sufficiently strengthened and the rigidity is not sufficiently improved. On the other hand, the total amount is more than 10% by mass, the glass is unstable, the toughness is greatly decreased, the clarity tends to be decreased, and the productivity is extremely decreased. As a result, the total amount of $TiO_2+ZrO_2$ needs to be in the range of 0.5-10% by mass, and more preferably in the range of 2-8% by mass.

The total amount of $Ln_xO_y$ (at least one compound selected from the group of lanthanoid metal oxide, $Y_2O_3$, $Nb_2O_5$, and $Ta_2O_5$) is preferably in the range of 0-5% by mass (including zero). Any of $Ln_xO_y$ has a common effective that the glass structure is strengthened and the rigidity and the toughness are improved. However, the total amount of $Ln_xO_y$ is more than 5% by mass, the glass is unstable, the rigidity is greatly decreased, the clarity tends to be decreased, and the productivity is extremely decreased. As a result, the total amount of $Ln_xO_y$ is preferably in the range of 0-5% by mass (including zero), more preferably in the range of 0-4% by mass (including zero).

In the case of the glass substrate containing the above-mentioned constituents, when the predetermined polyvalent element which functions as a fining agent made of oxide in the glass is contained such that the mole ratio of the total amount of the oxide of the polyvalent element with respect to the total amount of $TiO_2+ZrO_2$ is in the predetermined range, the glass bubbles can be sufficiently removed without adding any element of As or Sb. The polyvalent element of the embodiment is at least one element selected from the group consisting of V, Mn, Ni, Mo, Sn, Ce, and Bi, and the mole ratio of the total amount of the oxide of the polyvalent element with respect to the total amount of $TiO_2+ZrO_2$ ((the total amount of the oxide of the polyvalent element)/(the total amount of $TiO_2+ZrO_2$)) needs to be set within the range of 0.05-0.50, assuming each of the oxides of the polyvalent elements as $V_2O_5$, $MnO_2$, $Ni_2O_3$, $MoO_3$, $SnO_2$, $CeO_2$, and $Bi_2O_3$. In addition, when Ce is contained as a polyvalent element, glass with low incidence rate of crack can be obtained.

The reason why the gas bubbles in the glass can be sufficiently removed without adding As or Sb when the predetermined polyvalent element is contained at a predetermined percentage is thought as follows.

Typically, the fining agent having a form of oxide in the glass contributes to the removal (fining) of the gas bubble in the molten glass by the following two actions.

(a) The first action is to release gas in the molten glass in the process of increasing the temperature of the molten glass. The gas bubbles in the molten glass are raised by the buoyancy force of the gas, and break and disappear when they reach the surface of the molten glass. The ascent speed of the gas bubbles in the molten glass depends largely on the size of the gas bubbles, and the large gas bubbles have a high ascent speed and relatively easily reach the surface, but small gas bubbles have a low ascent speed and take a lot of time to reach the surface. In the course of raising the temperature of the molten glass, the gas released from the fining agent causes the gas bubbles in the molten glass to grow large, and the ascent speed of the gas bubbles thus gets higher, accelerating the removal of the gas bubbles.

In the case that Ce is contained as a polyvalent element, for example, when the temperature is raised to a high temperature, the reaction of the following Equation 1 proceeds to the right and $O_2$ gas is released in the molten glass. The released $O_2$ gas causes the gas bubbles in the molten glass to glow large and disappear on the surface of the molten glass.

$$2CeO_2 = Ce_2O_3 + \frac{1}{2}O_2 \qquad \text{(Equation 1)}$$

(b) The second action is to absorb the gas in the molten glass in the course of decreasing the temperature of the molten glass. In the case that Ce is contained as a polyvalent element, for example, the reaction of Equation 1 proceeds to the left in the course of decreasing the temperature. As a result, the $O_2$ gas in the molten glass is absorbed and the gas bubbles thus shrink and disappear.

As described above, in order to sufficiently remove the gas bubbles in the molten glass, release and absorption of gas need to be effectively performed due to the change in valence of a polyvalent element which functions as a fining agent made of oxide. The reaction of the change in valence of a polyvalent element functioning as a fining agent made of oxide is greatly affected by other metal ion, especially the oxidation-reduction reaction of Zr ion co-existing in the molten glass. Thus, it is thought that in the glass of the embodiment containing a predetermined glass components, when the mole ratio of the total amount of the oxide of the polyvalent element to the total amount of $TiO_2+ZrO_2$ ((the total amount of the oxide of the polyvalent element)/(the total amount of $TiO_2+ZrO_2$)) is within the range of 0.05-0.50, the change in valence of the polyvalent element makes the fining reaction especially effective.

As the polyvalent element, at least one selected from the group consisting of V (vanadium), Mn (manganese), Ni (nickel), Mo (molybdenum), Sn (tin), Ce (cerium), and Bi (bismuth). Only one polyvalent element may be contained alone, or more than one of polyvalent element may be contained. Among them, V, Mn, Sn, and Ce are preferable since they can remove gas bubbles especially effectively. In addition, it is advantageous to contain Ce as a polyvalent element since it provides glass having a low incidence rate of crack The mole ratio of the above-mentioned total amount of the oxide of the polyvalent element to the total amount of $TiO_2+ZrO_2$ ((the total amount of the oxide of the polyvalent element)/(the total amount of $TiO_2+ZrO_2$)) is out of the predetermined range, the fining reaction is not caused sufficiently by the change in valence, and it is thus difficult to remove the gas bubbles in the molten glass sufficiently. As a result, the above-mentioned mole ratio needs to be in the range of 0.05-0.50, and more preferably in the range of 0.1-0.4. The mole ratios are each calculated assuming the above-mentioned oxide of the polyvalent element as $V_2O_5$, $MnO_2$, $Ni_2O_3$, $MoO_3$, $SnO_2$, $CeO_2$, and $Bi_2O_3$.

In addition, from the view point of how to sufficiently realize the effect of fining without lowering the devitrification resistance, the content of the oxide of each of the polyvalent element $V_2O_5$, $MnO_2$, $Ni_2O_3$, $MoO_3$, $SnO_2$, $CeO_2$, and $Bi_2O_3$ is preferably 1% by mass or less with respect to the whole of the glass components.

Although these polyvalent elements function as a fining agent made of oxide in the molten glass, the raw materials are not restricted to a form of oxide, but they can be selected and used front known forms of raw materials such as simple metal, hydroxide, sulfate, and carbonate. Among them, from a view point of easy handling, it is preferable to add as a fining agent made of oxide, hydroxide, of carbonate.

(Glass Substrate for Information Recording Media)

Next, a glass substrate for information recording media of the embodiment is described. There is no restriction in the manufacturing method of a glass substrate, a known manufacturing method can be used. For example, oxide, carbonate, nitrate, and hydroxide are used as respective raw materials for the constituent, and they are measured and sufficiently mixed in powder forms to prepare the row materials. They are put in a platinum crucible in an electric furnace heated up to 1300-1550° C., and are melted and fined, then stirred to be uniform, cast into a pre-heated mold, and then slowly cooled to be a glass block. Next, they are heated again up to near the glass-transition point and slowly cooled to remove distortion. The obtained glass block is sliced in a disc shape, and the inner periphery and the outer periphery are cut out to be concentric circles with a core drill. Alternatively, the molten glass may be press molded into a disc shape. The both surfaces of the thus obtained disc-shaped glass substrates are subjected to rough polishing and fine polishing, and are then cleaned with liquid containing at least one of water, acid, and alkaline to be glass substrates for information recording media, as a final product.

From the view point of reducing the levitation amount of a head and reducing the film thickness of a recording medium, it is preferably that the surface roughness Ra (arithmetic average roughness) of the glass substrate after the polish step is made to be 1 nm or less and the surface roughness Ra' (arithmetic average roughness) after the cleaning step is made to be 1.5 times of the surface roughness Ra or less. In the case of a tempered glass substrate containing a great amount of alkaline constituent, it is possible to reduce the surface roughness Ra to be 1 nm or less by polishing however, in the next cleaning step when the substrate surface is cleaned in water, acid, or alkaline, the surface is greatly corroded because of its low chemical durability, and surface roughness Ra' gets larger after the cleaning step. On the other hand, in the case of a un-tempered glass substrate, the composition is uniform from the surface to the inner part, and the surface roughness Ra' of the substrate does not change in the cleaning step. Thus, it is also possible to realize the surface roughness Ra' after the cleaning step to be 1.5 times or less of the surface roughness R after the polish step, by optimizing the glass components.

The amount of alkaline elution A is preferably 300 ppb or less for a 2.5 inch disc. If the amount of alkaline elution A is more than 300 pp, an eluted alkaline constituent deteriorates a recording film such as a magnetic film formed on the surface of the glass substrate used as an information recording medium. The amount of alkaline elution A is more preferably 200 ppb or less.

The thermal linear expansion coefficient $\alpha$ is preferably in the rang of $60 \times 10^{-7} - 90 \times 10^{-7}/°$ C. That is because, if the thermal linear expansion coefficient $\alpha$ is out of this range, the deviation from the thermal linear expansion coefficient of the material of the drive section on which the information recording medium made of the glass substrate is mounted is large, and thus a stress occurs at a fixing portion of the information recording medium, with the result that the substrate beaks or the deformation of the substrate is generated, and this deformation leads to a miss alignment of the recording position resulting in disabling read or write of the recording. It is more preferable that the lower limit of the thermal linear expansion coefficient is $62 \times 10^{-7}/°$ C. and the upper limit of that is $88 \times 10^{-7}/°$ C.

The fracture toughness value Kc is preferably 0.80 or more. If the fracture toughness value Kc is lower than 0.80, cracks may be created in the glass substrate due to a pressure applied in the step of forming on the surface of glass substrate a recording film such as a magnetic film. In addition, the fracture toughness value Kc is less than 0.80, the substrate tends to be damaged in the machining process on the substrate, thereby greatly decreasing the yield of machining. The more preferable lower limit of the fracture toughness value Kc is 0.85. The fracture toughness value Kc can be calculated by Equation 2 based on the impression made, in the glass substrate, with a Vickers indenter by using a Vickers hardness tester.

$$Kc = 0.018(E/Hv)^{1/2}(P/C^{3/2}) = 0.026 E^{1/2} P^{1/2} a/C^{3/2} \quad \text{(Equation 2)}$$

where:
Kc is a fracture toughness value ($Pa \cdot m^{1/2}$);
E is a coefficient of elasticity (Pa);
Hv is a Vickers hardness (Pa);
P is a push-in force (N);
C is a half of an average of crack lengths (m); and
a is a half of an average of diagonal lengths of impressions.

Figure 1:
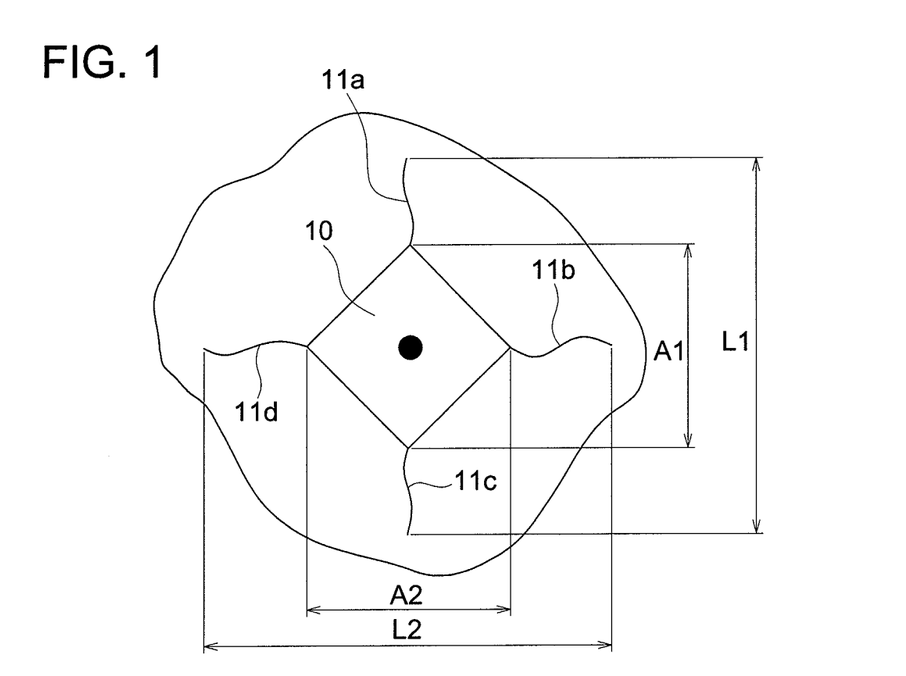
FIG. 1 is a schematic diagram of a Vickers impression.

FIG. 1 is a schematic diagram of a Vickers impression. Each of the cracks 11a-11d extends from the each of the Vickers impression 10. In this situation, a (a half of an average of diagonal lengths of impressions) and C (a half of an average of crack lengths) of Equation 2 are each obtained from the following equations.

$$a = ((A1+A2)/2)/2) \quad \text{(Equation 3)}$$

where:
A1 and A2 are diagonal lengths of the Vickers impression 10 in the two directions perpendicular to each other.

$$C = ((L1+L2)/2)/2) \quad \text{(Equation 4)}$$

where:
L1 is distance between the both ends of two cracks extending in A1 direction; and
L2 is a distance between the both ends of two cracks extending in A2 direction.

The crack incidence rate is preferably 60% or less. That is because, if the crack incidence rate is 60% of more, cracks may be generated in the glass substrate due to a pressure applied in the step of forming on the glass substrate surface a recording film such as magnetic film. In addition, if the crack incidence rate is 60% or more, the machining rate greatly fluctuates when machining the substrate, thereby decreasing the machining yield. The more preferable crack incidence rate is 50% or less. The crack incidence rate used is an incidence rate of crack when an impression is made with a Vickers indenter under the condition of a load of 200 g and a loading time of 15 s, by using a Vickers hardness tester.

The glass substrate for information recording media of the embodiment is not restricted in its size, and it can be a small disc such as 3.5 inches, 2.5 inches, 1.8 inches or less than that. In addition, the thickness can be thin such as 2 mm, 1 mm, 0.63 mm, or less than that.

(Information Rerecording Medium)

Figure 2:
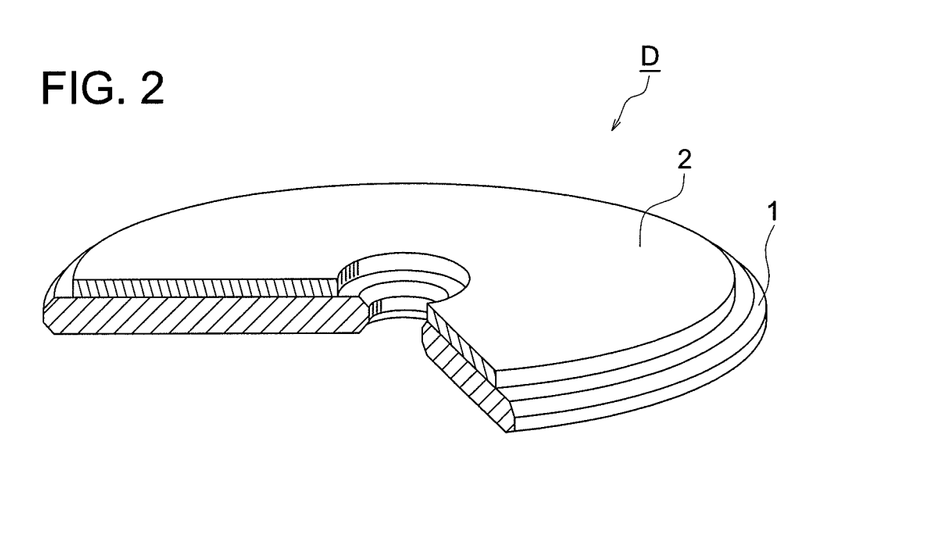
FIG. 2 is a perspective view of a magnetic disc D, which is an example of the information recording medium.

Next, an information recording medium using a glass substrate of the embodiment is described. Use of a glass substrate for information recording media of the embodiment as a substrate of an information recording medium realizes high durability and high recording density. The information recording medium is described below with reference to the drawings.

FIG. 2 is a perspective view of a magnetic disc D, which is an example of the information recording medium. The magnetic disc D is made by directly forming a magnetic film 2 on a surface of a disc-shaped glass substrate for information recording media 1. The magnetic film 2 can be formed by a conventionally known method, and for example, there can be listed a method in which the substrate is spin-coated with a thermo curable resin having magnetic particles dispersed therein, and a method in which the magnetic film is formed by a sputtering method or an electroless plating method. The film thickness to be obtained is about 0.3-1.2 µm by a spin coat method, about 0.04-0.08 µm by a sputtering method, and about 0.05-0.1 µm by an electroless plating method, and from the viewpoint of attaining a thinner film and a higher density, the film is preferably formed by a sputtering method or an electroless plating method.

A magnetic material for the magnetic film 2 is not specifically restricted, and a conventionally known material can be used. Cobalt (Co), which has a high crystalline anisotropy, is basically used for a high cohesive force, and preferable is a Co based alloy to which Ni or Cr is added to adjust a residual magnetic flux density. In particular, there can be exemplified CoPt, CoCr, CoNi, CoNiCr, CoCrTa, CoPtCr, CoNiPt, CoNiCrPt, CoNiCrTa, CoCrPtTa, CoCrPtB, and CoCrPtSiO, which contain Co as a major constituent. The magnetic film 2 may have a multilayer construction (for example CoPtCr/CrMo/CoPtCr, or CoCrPtTa/CrMo/CoCrPtTa) which is separated by a nonmagnetic film such as Cr, CrMo, or CrV to reduce noise. In addition to the above-mentioned magnetic materials, ferrite based material or iron-rare earth based material can be used, and granular in which magnetic particles such as Fe, Co, FeCo, or CoNiPt are dispersed in a nonmagnetic film made of $SiO_2$ or BN can be used. Alternatively, the magnetic film 2 may be either an in-plane recording type or a vertical recording type.

In addition, the surface of the magnetic film is coated with a lubricant agent for a smooth movement of a magnetic head. As the lubricant agent, there can be exemplified a liquid lubricant agent perfluoropolyether (PFPE) diluted with freon base solvent, for example.

An underlayer or a protection layer may be further formed if required. The underlayer for the magnetic disc is selected depending on the magnetic film 2. As the material for the underlayer, there can be listed at least one material or more selected from the nonmagnetic metals such as Cr, Mo, Ta, Ti, W, V, B, Al, and Ni, for example. For the magnetic film 2 having a major constituent of Co, simple Cr or Cr alloy is preferable from the viewpoint of improving the magnetization property. In addition, the underlayer does not need to be a single layer, and it can have a multilayer construction in which the same or different layers are stacked. For example, it can be a multiple layered underlayer such as Cr/Cr, Cr/CrMo, Cr/CrV, NiAl/Cr, NiAl/CrMo, or NiAl/CrV.

As a protection layer for preventing the magnetic film 2 from being worn or eroded, there can be listed a Cr layer, a Cr alloy layer, a carbon layer, a carbon hydride layer, a zilconia layer, and a silica layer, for example. These protection layers can be formed together with the underlayer and the magnetic film 2 in an in-line sputtering device. In addition, these protection layers may be a single layer have a multilayer structure made of the same material layers or different material layers. Other protection layer may be formed on the above-mentioned protection layer or instead of the above-mentioned protection layer. For example, instead of the above-mentioned protection layer, a silicon oxide ($SiO_2$) layer may be formed in such a manner that tetraalkoxysilane diluted with alcoholic solvent with small colloidal silica particles dispersed therein is applied on the surface of the Cr layer and is then burned.

A magnetic disc is described above as an embodiment of the information recording medium, but the information recording medium is not restricted thereto, and the glass substrate for information recording media of the embodiment can be applied to an optical magnetic disc and an optical disc.

EXAMPLES

There are described below examples made to confirm advantages of the present invention, but the present invention is not restricted thereto.

A predetermined amount of raw material powder was measured and put in a platinum crucible, was mixed, and then melted in an electric furnace at 1550° C. After the raw materials were sufficiently melted, a stirring blade was put in the molten glass to stir for about one hour. Then, the stirring blade was taken out, the molten glass was left for 30 min as it was, and was cast in a jig to obtain a glass block. Then, the glass blocks were re-heated up near the glass-transition point of the glass, and gradually cooled to remove distortion. The obtained glass blocks were sliced in a disc shape having a thickness of about 1.5 mm and a diameter of 2.5 inches, and the inner periphery and the outer periphery were cut out to be concentric circles. Then, the both surfaces were subjected to rough polishing, fine polishing, and cleaning, and the glass substrates 1-56 of examples and comparable examples were produced. The produced glass substrates were evaluated for the following physical characteristics. Tables 1-8 show the results.

(Number of Gas Bubbles)

The number of residual gas bubbles is measured for each of the produced glass substrate. The measurement was done for the whole surface of the glass substrate, and the number of the gas bubbles for one glass substrate 1 was measured by using a 50× microscope.

(Amount of Alkaline Elution A)

After polishing the surface of the glass substrate with cerium oxide to make a smooth surface having Ra value of 2 nm or less, the surface was cleaned, and the glass substrate was immersed in 50 ml of pure water at 80° C. for 24 h, then the elution liquid was analyzed by an ICP emission spectrophotometer to calculate the amount of alkaline elution A.

(Thermal Linear Expansion Coefficient $\alpha$)

A differential dilatometer was used for the measurement under the condition: a load was 5 g; a temperature range was 25-100° C.; and a rate of temperature increase was 5° C./min.

(Fracture Toughness Value Kc)

By using a Vickers hardness tester, an impression was made with a Vickers indenter under the condition that a load was 500 g and the loading time was 15 sec, and the fracture toughness value Kc was calculated by the Equations 2-4.

(Crack Incidence Rate)

The crack incidence rate was calculated by calculating the number of cracks which was produced when an impression was made with the Vickers indenter by using the Vickers hardness tester under the condition that a load was 200 g and the loading time was 15 sec.

TABLE 1

|  |  | Comp. 1 | Example 2 | Example 3 | Example 4 | Comp. 5 | Comp. 6 | Comp. 7 |
|---|---|---|---|---|---|---|---|---|
| Composition (% by mass) | $SiO_2$ | 59.0 | 58.8 | 59.2 | 59.2 | 59.0 | 59.0 | 58.9 |
|  | $Al_2O_3$ | 13.4 | 13.6 | 13.5 | 12.9 | 12.9 | 13.5 | 13.5 |
|  | $B_2O_3$ | 2.0 | 2.0 | 2.0 | 2.2 | 2.2 | 2.2 | 2.0 |
|  | $Li_2O$ | 8.4 | 8.4 | 8.4 | 8.4 | 8.4 | 8.4 | 8.4 |
|  | $Na_2O$ | 1.4 | 1.4 | 1.4 | 1.6 | 1.6 | 1.6 | 1.6 |
|  | $K_2O$ | 2.4 | 2.4 | 2.0 | 2.0 | 2.0 | 2.4 | 2.4 |
|  | MgO | 4.6 | 4.6 | 4.6 | 4.6 | 4.6 | 4.6 | 4.6 |
|  | CaO | 3.2 | 3.2 | 3.2 | 3.2 | 3.2 |  |  |
|  | SrO |  |  |  |  |  |  |  |
|  | BaO |  |  |  |  |  |  |  |
|  | ZnO |  |  |  |  |  |  |  |

TABLE 1-continued

|  |  | Comp. 1 | Example 2 | Example 3 | Example 4 | Comp. 5 | Comp. 6 | Comp. 7 |
|---|---|---|---|---|---|---|---|---|
|  | $TiO_2$ |  |  |  |  |  |  |  |
|  | $ZrO_2$ | 2.5 | 2.5 | 2.5 | 2.5 | 2.5 | 2.5 | 2.5 |
|  | $Y_2O_3$ |  |  |  |  |  |  |  |
|  | $Nb_2O_5$ | 2.5 | 2.5 | 2.5 | 2.5 | 2.0 | 2.5 | 2.5 |
|  | $Ta_2O_5$ |  |  |  |  |  |  |  |
| $SiO_2 + Al_2O_3 + B_2O_3$ (% by mass) |  | 74.4 | 74.4 | 74.7 | 74.3 | 74.1 | 74.7 | 74.4 |
| $R_2O$ ($Li_2O + Na_2O + K_2O$) (% by mass) |  | 12.2 | 12.2 | 11.8 | 12.0 | 12.0 | 12.4 | 12.4 |
| R'O (MgO + CaO + SrO + BaO + ZnO) (% by mass) |  | 7.8 | 7.8 | 7.8 | 7.8 | 7.8 | 4.6 | 4.6 |
| $TiO_2 + ZrO_2$ (% by mass) |  | 2.5 | 2.5 | 2.5 | 2.5 | 2.5 | 2.5 | 2.5 |
| $Ln_xO_y$ (% by mass) |  | 2.5 | 2.5 | 2.5 | 2.5 | 2.0 | 2.5 | 2.5 |
| Oxide of Polyvalent Element (% by mass) |  | 0.10($V_2O_5$) | 0.20($V_2O_5$) | 0.30($V_2O_5$) | 0.60($V_2O_5$) | 1.90($V_2O_5$) | 3.00($V_2O_5$) | 3.50($V_2O_5$) |
| Mole Fraction (Total Amount of Polyvalent Element/($TiO_2 + ZrO_2$) |  | 0.03 | 0.05 | 0.08 | 0.16 | 0.51 | 0.81 | 0.95 |
| Number of Gas Bubbles |  | 54 | 9 | 3 | 5 | 31 | 35 | 30 |
| Alkaline Elution A (ppb) |  | 228 | 216 | 254 | 203 | 209 | 228 | 218 |
| Thermal Linear Expansion Coefficient α ($\times 10^{-7}$/° C.) |  | 69 | 71 | 69 | 71 | 71 | 70 | 71 |
| Fracture Toughness Value Kc |  | 1.05 | 1.01 | 0.98 | 0.99 | 0.98 | 1.02 | 1.01 |
| Crack Incidence Rate (%) |  | 48 | 50 | 53 | 54 | 54 | 50 | 49 |

Comp.: Comparative Example

TABLE 2

|  |  | Comp. 8 | Comp. 9 | Example 10 | Example 11 | Example 12 | Comp. 13 | Comp. 14 |
|---|---|---|---|---|---|---|---|---|
| Composition (% by mass) | $SiO_2$ | 63.8 | 63.8 | 63.8 | 60.4 | 60.4 | 60.4 | 60.4 |
|  | $Al_2O_3$ | 13.2 | 13.2 | 13.2 | 13.2 | 12.0 | 13.1 | 12.0 |
|  | $B_2O_3$ | 3.0 | 3.0 | 3.0 | 3.0 | 3.0 | 3.0 | 3.0 |
|  | $Li_2O$ | 6.3 | 6.3 | 6.3 | 6.3 | 6.3 | 6.3 | 6.3 |
|  | $Na_2O$ | 3.4 | 1.7 | 1.8 | 1.8 | 1.9 | 1.9 | 1.9 |
|  | $K_2O$ | 1.5 | 4.5 | 4.5 | 4.5 | 4.5 | 4.5 | 4.5 |
|  | MgO | 3.2 | 3.2 | 3.2 | 4.4 | 4.4 | 3.0 | 3.0 |
|  | CaO | 2.0 | 2.0 | 2.0 |  |  |  |  |
|  | SrO |  |  |  | 2.5 | 2.5 | 2.5 | 2.5 |
|  | BaO |  |  |  |  |  |  |  |
|  | ZnO |  |  |  |  |  |  |  |
|  | $TiO_2$ | 2.5 | 2.5 | 2.5 | 2.5 | 2.5 | 2.5 | 2.5 |
|  | $ZrO_2$ |  |  |  |  |  |  |  |
|  | $Y_2O_3$ |  |  |  | 2.3 | 2.3 | 2.3 | 2.3 |
|  | $Nb_2O_5$ |  |  |  |  |  |  |  |
|  | $Ta_2O_5$ |  |  |  |  |  |  |  |
| $SiO_2 + Al_2O_3 + B_2O_3$ (% by mass) |  | 80.0 | 80.0 | 80.0 | 76.6 | 75.4 | 76.5 | 75.4 |
| $R_2O$ ($Li_2O + Na_2O + K_2O$) (% by mass) |  | 11.2 | 12.5 | 12.6 | 12.6 | 12.7 | 12.7 | 12.7 |
| R'O (MgO + CaO + SrO + BaO + ZnO) (% by mass) |  | 5.2 | 5.2 | 5.2 | 6.9 | 6.9 | 5.5 | 5.5 |
| $TiO_2 + ZrO_2$ (% by mass) |  | 2.5 | 2.5 | 2.5 | 2.5 | 2.5 | 2.5 | 2.5 |
| $Ln_xO_y$ (% by mass) |  | 0.0 | 0.0 | 0.0 | 2.3 | 2.3 | 2.3 | 2.3 |
| Oxide of Polyvalent Element (% by mass) |  | 0.05($MnO_2$) | 0.10($MnO_2$) | 0.14($MnO_2$) | 0.30($MnO_2$) | 0.80($MnO_2$) | 1.40($MnO_2$) | 1.60($MnO_2$) |
| Mole Fraction (Total Amount of Polyvalent Element/($TiO_2 + ZrO_2$) |  | 0.02 | 0.04 | 0.05 | 0.11 | 0.29 | 0.51 | 0.59 |
| Number of Gas Bubbles |  | 44 | 33 | 10 | 5 | 0 | 33 | 47 |
| Alkaline Elution A (ppb) |  | 189 | 179 | 204 | 218 | 220 | 228 | 216 |
| Thermal Linear Expansion Coefficient α ($\times 10^{-7}$/° C.) |  | 65 | 64 | 65 | 65 | 64 | 66 | 66 |
| Fracture Toughness Value Kc |  | 1.13 | 1.14 | 1.24 | 1.21 | 1.1 | 1.15 | 1.15 |
| Crack Incidence Rate (%) |  | 45 | 44 | 42 | 41 | 45 | 44 | 46 |

Comp.: Comparative Example

TABLE 3

|  |  | Comp. 15 | Example 16 | Example 17 | Example 18 | Example 19 | Comp. 20 | Comp. 21 |
|---|---|---|---|---|---|---|---|---|
| Composition (% by mass) | $SiO_2$ | 68.0 | 68.0 | 68.0 | 68.0 | 68.0 | 68.0 | 68.0 |
|  | $Al_2O_3$ | 10.2 | 10.2 | 10.2 | 10.2 | 10.2 | 10.2 | 102 |
|  | $B_2O_3$ |  |  |  |  |  |  |  |

TABLE 3-continued

|  |  | Comp. 15 | Example 16 | Example 17 | Example 18 | Example 19 | Comp. 20 | Comp. 21 |
|---|---|---|---|---|---|---|---|---|
|  | $Li_2O$ | 4.3 | 4.3 | 4.3 | 4.3 | 4.3 | 4.3 | 4.3 |
|  | $Na_2O$ | 2.0 | 2.0 | 2.1 | 2.1 | 2.2 | 2.2 | 2.2 |
|  | $K_2O$ | 3.2 | 3.2 | 3.2 | 3.2 | 3.2 | 3.2 | 3.2 |
|  | MgO | 3.0 | 3.0 | 3.0 | 3.0 | 3.0 | 3.0 | 3.0 |
|  | CaO | 4.5 | 4.5 | 4.5 | 4.5 | 4.5 | 4.5 | 4.5 |
|  | SrO |  |  |  |  |  |  |  |
|  | BaO |  |  |  |  |  |  |  |
|  | ZnO |  |  |  |  |  |  |  |
|  | $TiO_2$ |  |  |  |  |  |  |  |
|  | $ZrO_2$ | 2.5 | 2.5 | 2.5 | 2.5 | 2.5 | 2.5 | 2.5 |
|  | $Y_2O_3$ |  |  |  |  |  |  |  |
|  | $Nb_2O_5$ |  |  |  |  |  |  |  |
|  | $Ta_2O_5$ | 2.1 | 2.1 | 2.1 | 2.1 | 2.1 | 2.1 | 2.1 |
| $SiO_2 + Al_2O_3 + B_2O_3$ (% by mass) | | 78.2 | 78.2 | 78.2 | 78.2 | 78.2 | 78.2 | 78.2 |
| $R_2O$ ($Li_2O + Na_2O + K_2O$) (% by mass) | | 9.5 | 9.5 | 9.6 | 9.6 | 9.7 | 9.7 | 9.7 |
| R'O (MgO + CaO + SrO + BaO + ZnO) (% by mass) | | 7.5 | 7.5 | 7.5 | 7.5 | 7.5 | 7.5 | 7.5 |
| $TiO_2 + ZrO_2$ (% by mass) | | 2.5 | 2.5 | 2.5 | 2.5 | 2.5 | 2.5 | 2.5 |
| $Ln_xO_y$ (% by mass) | | 2.1 | 2.1 | 2.1 | 2.1 | 2.1 | 2.1 | 2.1 |
| Oxide of Polyvalent Element (% by mass) | | 0.10($Ni_2O_3$) | 0.20($Ni_2O_3$) | 0.25($Ni_2O_3$) | 0.70($Ni_2O_3$) | 1.50($Ni_2O_3$) | 2.50($Ni_2O_3$) | 3.00($Ni_2O_3$) |
| Mole Fraction (Total Amount of Polyvalent Element/($TiO_2 + ZrO_2$) | | 0.03 | 0.06 | 0.07 | 0.21 | 0.45 | 0.75 | 0.89 |
| Number of Gas Bubbles | | 34 | 6 | 9 | 3 | 2 | 31 | 30 |
| Alkaline Elution A (ppb) | | 163 | 157 | 169 | 153 | 152 | 147 | 142 |
| Thermal Linear Expansion Coefficient α ($\times 10^{-7}/°C$) | | 65 | 65 | 64 | 65 | 66 | 65 | 66 |
| Fracture Toughness Value Kc | | 1.23 | 1.09 | 1.17 | 1.25 | 1.15 | 1.1 | 1.2 |
| Crack Incidence Rate (%) | | 43 | 48 | 46 | 45 | 45 | 48 | 45 |

Comp.: Comparative Example

TABLE 4

|  |  | Comp. 22 | Comp. 23 | Example 24 | Example 25 | Example 26 | Comp. 27 | Comp. 28 |
|---|---|---|---|---|---|---|---|---|
| Composition (% by mass) | $SiO_2$ | 63.0 | 63.0 | 63.0 | 63.0 | 63.0 | 63.0 | 63.0 |
|  | $Al_2O_3$ | 10.3 | 10.3 | 10.3 | 10.3 | 12.9 | 12.8 | 12.8 |
|  | $B_2O_3$ | 2.4 | 2.4 | 2.4 | 2.4 |  |  |  |
|  | $Li_2O$ | 8.4 | 8.4 | 8.4 | 8.4 | 8.4 | 8.4 | 8.4 |
|  | $Na_2O$ | 2.3 | 2.3 | 2.4 | 2.4 | 2.5 | 2.5 | 2.5 |
|  | $K_2O$ | 2.2 | 2.2 | 2.2 | 7.0 | 7.0 | 7.0 | 7.0 |
|  | MgO | 5.0 | 5.0 | 5.0 |  |  |  |  |
|  | CaO |  |  |  |  |  |  |  |
|  | SrO |  |  |  |  |  |  |  |
|  | BaO |  |  |  |  |  |  |  |
|  | ZnO | 1.2 | 1.2 | 1.2 | 1.2 |  |  |  |
|  | $TiO_2$ | 2.5 | 2.5 | 2.5 | 1.3 | 1.3 | 1.3 | 1.3 |
|  | $ZrO_2$ |  |  |  | 1.2 | 1.2 | 1.2 | 1.2 |
|  | $Y_2O_3$ |  |  |  | 2.1 | 2.1 | 2.1 |  |
|  | $Nb_2O_5$ | 2.1 | 2.1 | 2.1 |  |  |  | 2.1 |
|  | $Ta_2O_5$ |  |  |  |  |  |  |  |
| $SiO_2 + Al_2O_3 + B_2O_3$ (% by mass) | | 75.7 | 75.7 | 75.7 | 75.7 | 75.9 | 75.8 | 75.8 |
| $R_2O$ ($Li_2O + Na_2O + K_2O$) (% by mass) | | 12.9 | 13.0 | 13.0 | 17.8 | 17.9 | 17.9 | 17.9 |
| R'O (MgO + CaO + SrO + BaO + ZnO) (% by mass) | | 6.2 | 6.2 | 6.2 | 1.2 | 0.0 | 0.0 | 0.0 |
| $TiO_2 + ZrO_2$ (% by mass) | | 2.5 | 2.5 | 2.5 | 2.5 | 2.5 | 2.5 | 2.5 |
| $Ln_xO_y$ (% by mass) | | 2.1 | 2.1 | 2.1 | 2.1 | 2.1 | 2.1 | 2.1 |
| Oxide of Polyvalent Element (% by mass) | | 0.10($MoO_3$) | 0.20($MoO_3$) | 0.23($MoO_3$) | 0.50($MoO_3$) | 1.30($MoO_3$) | 2.10($MoO_3$) | 2.60($MoO_3$) |
| Mole Fraction (Total Amount of Polyvalent Element/($TiO_2 + ZrO_2$) | | 0.02 | 0.04 | 0.05 | 0.13 | 0.35 | 0.56 | 0.69 |
| Number of Gas Bubbles | | 58 | 49 | 17 | 3 | 3 | 36 | 38 |
| Alkaline Elution A (ppb) | | 228 | 216 | 210 | 269 | 253 | 249 | 251 |
| Thermal Linear Expansion Coefficient α ($\times 10^{-7}/°C$) | | 69 | 69 | 70 | 69 | 73 | 73 | 74 |
| Fracture Toughness Value Kc | | 1.03 | 1.11 | 1.14 | 1.08 | 1.08 | 1.02 | 1.19 |
| Crack Incidence Rate (%) | | 54 | 50 | 48 | 51 | 50 | 52 | 50 |

Comp.: Comparative Example

TABLE 5

|  |  | Comp. 29 | Example 30 | Example 31 | Example 32 | Example 33 | Comp. 34 | Comp. 35 |
|---|---|---|---|---|---|---|---|---|
| Composition (% by mass) | $SiO_2$ | 70.0 | 70.0 | 71.0 | 71.0 | 70.0 | 70.0 | 70.0 |
|  | $Al_2O_3$ | 6.0 | 6.0 | 5.0 | 5.0 | 6.0 | 6.0 | 6.0 |
|  | $B_2O_3$ |  |  |  |  |  |  |  |
|  | $Li_2O$ | 9.3 | 9.3 | 9.3 | 9.3 | 9.3 | 9.3 | 9.3 |
|  | $Na_2O$ | 2.6 | 2.6 | 2.7 | 2.7 | 2.8 | 2.8 | 2.8 |
|  | $K_2O$ | 2.2 | 2.2 | 2.2 | 2.2 | 2.2 | 2.2 | 2.2 |
|  | MgO |  |  |  |  |  |  |  |
|  | CaO | 3.2 | 3.2 | 3.2 | 3.2 | 3.2 | 3.2 | 3.2 |
|  | SrO |  |  |  |  |  |  |  |
|  | BaO | 2.3 | 2.3 | 2.3 | 2.3 | 2.3 | 2.3 | 2.3 |
|  | ZnO |  |  |  |  |  |  |  |
|  | $TiO_2$ |  |  |  |  |  |  |  |
|  | $ZrO_2$ | 2.5 | 2.5 | 2.5 | 2.5 | 2.5 | 2.5 | 2.5 |
|  | $Y_2O_3$ |  |  |  |  |  |  |  |
|  | $Nb_2O_5$ | 2.1 | 2.1 | 2.1 | 2.1 |  |  |  |
|  | $Ta_2O_5$ |  |  |  |  |  |  |  |
| $SiO_2 + Al_2O_3 + B_2O_3$ (% by mass) |  | 76.0 | 76.0 | 76.0 | 76.0 | 76.0 | 76.0 | 76.0 |
| $R_2O$ ($Li_2O + Na_2O + K_2O$) (% by mass) |  | 14.1 | 14.2 | 14.2 | 14.2 | 14.3 | 14.3 | 14.4 |
| R'O (MgO + CaO + SrO + BaO + ZnO) (% by mass) |  | 5.5 | 5.5 | 5.5 | 5.5 | 5.5 | 5.5 | 5.5 |
| ($TiO_2$) + $ZrO_2$ (% by mass) |  | 2.5 | 2.5 | 2.5 | 2.5 | 2.5 | 2.5 | 2.5 |
| $Ln_xO_y$ (% by mass) |  | 2.1 | 2.1 | 2.1 | 2.1 | 0.0 | 0.0 | 0.0 |
| Oxide of Polyvalent Element (% by mass) |  | 0.10($SnO_2$) | 0.20($SnO_2$) | 0.25($SnO_2$) | 0.50($SnO_2$) | 1.30($SnO_2$) | 2.10($SnO_2$) | 2.70($SnO_2$) |
| Mole Fraction (Total Amount of Polyvalent Element/($TiO_2 + ZrO_2$) |  | 0.03 | 0.07 | 0.08 | 0.16 | 0.43 | 0.69 | 0.88 |
| Number of Gas Bubbles |  | 42 | 3 | 2 | 0 | 0 | 35 | 35 |
| Alkaline Elution A (ppb) |  | 216 | 223 | 233 | 237 | 226 | 219 | 225 |
| Thermal Linear Expansion Coefficient α (×$10^{-7}$/° C.) |  | 65 | 65 | 67 | 66 | 65 | 66 | 66 |
| Fracture Toughness Value Kc |  | 1.23 | 1.26 | 1.19 | 1.27 | 1.2 | 1.17 | 1.23 |
| Crack Incidence Rate (%) |  | 45 | 45 | 49 | 39 | 42 | 44 | 45 |

Comp.: Comparative Example

TABLE 6

|  |  | Comp. 36 | Comp. 37 | Example 38 | Example 39 | Example 40 | Example 41 | Comp. 42 |
|---|---|---|---|---|---|---|---|---|
| Composition (% by mass) | $SiO_2$ | 63.5 | 63.5 | 63.5 | 63.3 | 63.3 | 63.3 | 63.3 |
|  | $Al_2O_3$ | 12.6 | 12.6 | 12.6 | 12.6 | 12.6 | 12.5 | 12.5 |
|  | $B_2O_3$ | 0.6 | 0.6 | 0.6 |  |  |  |  |
|  | $Li_2O$ | 8.4 | 8.4 | 8.4 | 8.0 | 8.0 | 8.0 | 8.0 |
|  | $Na_2O$ | 2.9 | 2.9 | 3.0 | 3.0 | 3.1 | 3.1 | 3.1 |
|  | $K_2O$ | 2.2 | 2.2 | 2.2 | 2.2 | 2.2 | 2.2 | 2.2 |
|  | MgO |  |  |  |  |  |  |  |
|  | CaO |  |  |  | 3.4 | 3.4 | 3.4 | 3.4 |
|  | SrO | 3.4 | 3.4 | 3.4 |  |  |  |  |
|  | BaO |  |  |  |  |  |  |  |
|  | ZnO |  |  |  |  |  |  |  |
|  | $TiO_2$ | 1.5 | 1.5 | 1.5 | 1.5 | 2.5 | 2.5 | 2.5 |
|  | $ZrO_2$ | 1.0 | 1.0 | 1.0 | 1.0 |  |  |  |
|  | $Y_2O_3$ | 1.7 | 1.7 | 1.7 | 1.7 | 1.7 | 1.7 | 1.7 |
|  | $Nb_2O_5$ | 2.1 | 2.1 | 2.1 |  |  |  |  |
|  | $Ta_2O_5$ |  |  |  | 2.1 | 2.1 | 2.1 | 2.1 |
| $SiO_2 + Al_2O_3 + B_2O_3$ (% by mass) |  | 76.7 | 76.7 | 76.7 | 75.9 | 75.9 | 75.8 | 75.8 |
| $R_2O$ ($Li_2O + Na_2O + K_2O$) (% by mass) |  | 13.5 | 13.6 | 13.6 | 13.2 | 13.3 | 13.3 | 13.4 |
| R'O (MgO + CaO + SrO + BaO + ZnO) (% by mass) |  | 3.4 | 3.4 | 3.4 | 3.4 | 3.4 | 3.4 | 3.4 |
| $TiO_2 + ZrO_2$ (% by mass) |  | 2.5 | 2.5 | 2.5 | 2.5 | 2.5 | 2.5 | 2.5 |
| $Ln_xO_y$ (% by mass) |  | 3.8 | 3.8 | 3.8 | 3.8 | 3.8 | 3.8 | 3.8 |
| Oxide of Polyvalent Element (% by mass) |  | 0.10($CeO_2$) | 0.20($CeO_2$) | 0.26($CeO_2$) | 0.60($CeO_2$) | 1.40($CeO_2$) | 2.30($CeO_2$) | 3.10($CeO_2$) |
| Mole Fraction (Total Amount of Polyvalent Element/($TiO_2 + ZrO_2$)) |  | 0.02 | 0.04 | 0.06 | 0.13 | 0.26 | 0.43 | 0.58 |
| Number of Gas Bubbles |  | 58 | 36 | 6 | 0 | 0 | 3 | 31 |
| Alkaline Elution A (ppb) |  | 219 | 216 | 248 | 222 | 241 | 218 | 215 |
| Thermal Linear Expansion Coefficient α (×$10^{-7}$/° C.) |  | 64 | 63 | 64 | 63 | 63 | 63 | 64 |
| Fracture Toughness Value Kc |  | 1.21 | 1.28 | 1.25 | 1.27 | 1.31 | 1.19 | 1.23 |
| Crack Incidence Rate (%) |  | 20 | 23 | 24 | 29 | 28 | 25 | 24 |

Comp.: Comparative Example

TABLE 7

|  |  | Comp. 43 | Example 44 | Example 45 | Example 46 | Example 47 | Comp. 48 | Comp. 49 |
|---|---|---|---|---|---|---|---|---|
| Composition (% by mass) | $SiO_2$ | 62.0 | 62.0 | 62.0 | 62.0 | 63.0 | 63.0 | 63.0 |
|  | $Al_2O_3$ | 12.6 | 12.6 | 12.6 | 12.6 | 12.6 | 12.5 | 12.5 |
|  | $B_2O_3$ | 4.1 | 4.1 | 4.1 | 4.1 |  |  |  |
|  | $Li_2O$ | 3.7 | 3.7 | 3.7 | 3.7 | 4.0 | 4.0 | 4.0 |
|  | $Na_2O$ | 2.9 | 2.9 | 3.0 | 3.0 | 3.1 | 3.1 | 3.1 |
|  | $K_2O$ | 2.2 | 2.2 | 2.2 | 2.2 | 2.2 | 2.2 | 2.2 |
|  | MgO | 7.0 | 7.0 | 6.5 | 6.5 | 6.5 | 7.0 | 5.0 |
|  | CaO |  |  |  |  |  |  |  |
|  | SrO |  |  |  |  |  |  |  |
|  | BaO |  |  |  |  |  |  |  |
|  | ZnO |  |  |  |  |  |  |  |
|  | $TiO_2$ |  |  |  |  | 1.5 | 1.5 | 1.5 |
|  | $ZrO_2$ | 2.5 | 2.5 | 2.5 | 1.0 | 1.0 | 1.0 | 1.0 |
|  | $Y_2O_3$ |  |  |  |  |  |  |  |
|  | $Nb_2O_5$ | 2.1 | 2.1 | 2.1 | 2.1 | 2.1 | 2.1 | 2.1 |
|  | $Ta_2O_5$ |  |  |  |  |  |  |  |
| $SiO_2 + Al_2O_3 + B_2O_3$ (% by mass) |  | 78.7 | 78.7 | 78.7 | 78.7 | 75.6 | 75.5 | 75.5 |
| $R_2O$ ($Li_2O + Na_2O + K_2O$) (% by mass) |  | 8.8 | 8.9 | 8.9 | 8.9 | 9.3 | 9.3 | 9.4 |
| R'O (MgO + CaO + SrO + BaO + ZnO) (% by mass) |  | 7.0 | 7.0 | 6.5 | 6.5 | 6.5 | 7.0 | 5.0 |
| $TiO_2 + ZrO_2$ (% by mass) |  | 2.5 | 2.5 | 2.5 | 2.5 | 2.5 | 2.5 | 2.5 |
| $Ln_xO_y$ (% by mass) |  | 2.1 | 2.1 | 2.1 | 2.1 | 2.1 | 2.1 | 2.1 |
| Oxide of Polyvalent Element (% by mass) |  | 0.25($Bi_2O_3$) | 0.60($Bi_2O_3$) | 0.70($Bi_2O_3$) | 1.40($Bi_2O_3$) | 4.00($Bi_2O_3$) | 7.00($Bi_2O_3$) | 8.20($Bi_2O_3$) |
| Mole Fraction (Total Amount of Polyvalent Element/($TiO_2 + ZrO_2$) |  | 0.03 | 0.06 | 0.07 | 0.11 | 0.32 | 0.56 | 0.65 |
| Number of Gas Bubbles |  | 24 | 5 | 7 | 5 | 2 | 31 | 30 |
| Alkaline Elution A (ppb) |  | 149 | 158 | 139 | 142 | 163 | 164 | 179 |
| Thermal Linear Expansion Coefficient α ($\times 10^{-7}$/° C.) |  | 63 | 64 | 64 | 63 | 63 | 63 | 64 |
| Fracture Toughness Value Kc |  | 1.3 | 1.34 | 1.26 | 1.21 | 1.2 | 1.19 | 1.19 |
| Crack Incidence Rate (%) |  | 35 | 34 | 35 | 40 | 40 | 44 | 42 |

Comp.: Comparative Example

TABLE 8

|  |  | Comp. 50 | Comp. 51 | Example 52 | Example 53 | Example 54 | Example 55 | Comp. 56 |
|---|---|---|---|---|---|---|---|---|
| Composition (% by mass) | $SiO_2$ | 68.0 | 68.0 | 68.0 | 67.0 | 67.0 | 67.0 | 67.0 |
|  | $Al_2O_3$ | 10.2 | 10.2 | 10.2 | 11.6 | 11.6 | 11.6 | 11.6 |
|  | $B_2O_3$ |  |  |  |  |  |  |  |
|  | $Li_2O$ | 4.3 | 4.3 | 4.3 | 4.3 | 4.3 | 4.3 | 4.3 |
|  | $Na_2O$ | 2.0 | 2.0 | 2.1 | 2.1 | 2.2 | 2.2 | 2.2 |
|  | $K_2O$ | 3.2 | 3.2 | 3.7 | 3.7 | 3.7 | 3.2 | 3.2 |
|  | MgO | 3.0 | 3.0 | 2.5 | 2.5 | 2.5 | 3.0 | 3.0 |
|  | CaO | 4.5 | 4.5 | 4.5 | 4.1 | 4.1 | 4.1 | 4.1 |
|  | SrO |  |  |  |  |  |  |  |
|  | BaO |  |  |  |  |  |  |  |
|  | ZnO |  |  |  |  |  |  |  |
|  | $TiO_2$ | 2.5 | 2.5 | 2.5 | 2.5 | 2.5 | 2.5 | 2.5 |
|  | $ZrO_2$ |  |  |  |  |  |  |  |
|  | $Y_2O_3$ | 2.1 | 2.1 | 2.1 | 2.1 | 2.1 | 2.1 | 2.1 |
|  | $Nb_2O_5$ |  |  |  |  |  |  |  |
|  | $Ta_2O_5$ |  |  |  |  |  |  |  |
| $SiO_2 + Al_2O_3 + B_2O_3$ (% by mass) |  | 78.2 | 78.2 | 78.2 | 78.6 | 78.6 | 78.6 | 78.6 |
| $R_2O$ ($Li_2O + Na_2O + K_2O$) (% by mass) |  | 9.5 | 9.5 | 10.1 | 10.1 | 10.2 | 9.7 | 9.7 |
| R'O (MgO + CaO + SrO + BaO + ZnO) (% by mass) |  | 7.5 | 7.5 | 7.0 | 6.6 | 6.6 | 7.1 | 7.1 |
| $TiO_2 + ZrO_2$ (% by mass) |  | 2.5 | 2.5 | 2.5 | 2.5 | 2.5 | 2.5 | 2.5 |
| $Ln_xO_y$ (% by mass) |  | 2.1 | 2.1 | 2.1 | 2.1 | 2.1 | 2.1 | 2.1 |
| Oxide of Polyvalent Element (% by mass) |  | 0.05($MnO_2$) | 0.05($MnO_2$) + 0.01($SnO_2$) | 0.06($MnO_2$) + 0.13($SnO_2$) | 0.2($MnO_2$) + 0.13($SnO_2$) | 0.5($MnO_2$) + 0.5($SnO_2$) | 0.9($MnO_2$) + 0.8($SnO_2$) | 1.0($MnO_2$) + 1.0($SnO_2$) |
| Mole Fraction (Total Amount of Polyvalent Element/($TiO_2 + ZrO_2$) |  | 0.02 | 0.02 | 0.05 | 0.10 | 0.29 | 0.50 | 0.58 |
| Number of Gas Bubbles |  | 48 | 38 | 9 | 0 | 5 | 8 | 29 |
| Alkaline Elution A (ppb) |  | 149 | 152 | 153 | 139 | 158 | 136 | 141 |
| Thermal Linear Expansion Coefficient α ($\times 10^{-7}$/° C.) |  | 63 | 63 | 65 | 64 | 65 | 63 | 63 |
| Fracture Toughness Value Kc |  | 1.2 | 1.22 | 1.17 | 1.19 | 1.15 | 1.28 | 1.18 |
| Crack Incidence Rate (%) |  | 40 | 38 | 42 | 38 | 40 | 36 | 39 |

Comp.: Comparative Example

As shown in Tables 1-8, it was confirmed that the glass substrates of Example 1-49 have an extremely low number of residual gas bubbles since the mole ratio of the total amount of the polyvalent element oxide, which functions as a fining agent made of oxide in the glass, with respect to the total amount of $TiO_2+ZrO_2$ in the glass components was in a predetermined range. In addition, any of the amount of alkaline elution, the thermal linear expansion coefficient, the fracture toughness value, and the crack incidence rate was not an problematic level at all for practical use.

DESCRIPTION OF THE NUMERALS

1: Glass substrate for information recording media
2: Magnetic film
10: Vickers impression
11$a$, 11$b$, 11$c$, 11$d$: Crack
D: Magnetic disc

The invention claimed is:

1. A glass substrate for information recording media, comprising, with respect to all components of the glass substrate:
   45% to 75% by mass of $SiO_2$;
   1% to 20% by mass of $Al_2O_3$; and
   0% to 8% by mass of $B_2O_3$,
   wherein a total amount of the $SiO_2$, the $Al_2O_3$, and the $B_2O_3$ is 65% to 90% by mass;
$R_2O$, a total amount of which being 7% to 20% by mass where:
   R represents Li, Na, or K;
R'O, a total amount of which being 0.1% to 12% by mass where:
   R' represents Mg, Ca, Sr, Ba, and Zn;
$TiO_2$; and optionally $ZrO_2$, where $TiO_2$ is an essential component, and a total amount of $TiO_2$ and the optional $ZrO_2$ is 0.5% to 10% by mass and the amount of $TiO_2$ is 2.5% by mass or less,
   wherein the glass substrate for information recording media comprises at least one polyvalent element selected from a group consisting of V, Mn, Ni, Mo, Sn, Ce, and Bi, and
   wherein a mole ratio, which is (a total amount of an oxide of the polyvalent element)/(a total amount of the $TiO_2$ and the $ZrO_2$), of the total amount of the oxide of the polyvalent element with respect to the total amount of the $TiO_2$ and the $ZrO_2$ is in a range of 0.10 to 0.50, assuming each of oxides of polyvalent elements as $V_2O_5$, $MnO_2$, $Ni_2O_3$, $MoO_3$, $SnO_2$, $CeO_2$, and $Bi_2O_3$.

2. The glass substrate for information recording media of claim 1, wherein:
   0% to 5% by mass of $Ln_xO_y$, the $Ln_xO_y$ being at least one compound selected from a group consisting of a lanthanoid metal oxide, $Y_2O_3$, $Nb_2O_5$, and $Ta_2O_5$.

3. The glass substrate for information recording media of claim 1, wherein the polyvalent element includes at least one element selected from a group consisting of V, Mn, Sn, and Ce.

4. The glass substrate for information recording media of claim 3, wherein the polyvalent element includes Ce.

5. The glass substrate for information recording media of claim 1, wherein a content of each of the oxides of the polyvalent elements $V_2O_5$, $MnO_2$, $Ni_2O_3$, $MoO_3$, $SnO_2$, $CeO_2$, and $Bi_2O_3$ is 1% by mass or less with respect to the all components of the glass substrate.

6. The glass substrate for information recording media of claim 1, wherein the components of the glass substrate includes neither As nor Sb.

7. The glass substrate for information recording media of claim 1, wherein the total amount of $TiO_2$ and the optional $ZrO_2$ is 1.3% to 10% by mass.

8. The glass substrate for information recording media of claim 1 comprising:
   $ZrO_2$, wherein the total amount of $TiO_2$ and $ZrO_2$ is 0.5% to 10% by mass.

9. The glass substrate for information recording media of claim 1 wherein the mole ratio of the total amount of the oxide of the polyvalent element to the total amount of the $TiO_2$ and the $ZrO_2$ controls the number of residual gas bubbles in the glass substrate.

10. An information recording medium, comprising:
   a glass substrate the glass substrate comprising
   45% to 75% by mass of $SiO_2$;
   1% to 20% by mass of $Al_2O_3$; and
   0% to 8% by mass of $B_2O_3$,
   wherein a total amount of the $SiO_2$, the $Al_2O_3$, and the $B_2O_3$ is 65% to 90% by mass;
$R_2O$, a total amount of which being 7% to 20% by mass where:
   R represents Li, Na, or K;
R'O, a total amount of which being 0.1% to 12% by mass where:
   R' represents Mg, Ca, Sr, Ba, and Zn;
$TiO_2$; and optionally $ZrO_2$, where $TiO_2$ is an essential component, and a total amount of $TiO_2$ and the optional $ZrO_2$ is 0.5% to 10% by mass and the amount of $TiO_2$ is 2.5% by mass or less,
   wherein the glass substrate comprises at least one polyvalent element selected from a group consisting of V, Mn, Ni, Mo, Sn, Ce, and Bi, and
   wherein a mole ratio, which is (a total amount of an oxide of the polyvalent element)/(a total amount of the $TiO_2$ and the $ZrO_2$), of the total amount of the oxide of the polyvalent element with respect to the total amount of the $TiO_2$ and the $ZrO_2$ is in a range of 0.10 to 0.50, assuming each of oxides of polyvalent elements as $V_2O_5$, $MnO_2$, $Ni_2O_3$, $MoO_3$, $SnO_2$, $CeO_2$, and $Bi_2O_3$; and
   a recording layer provided on a surface of the glass substrate.

* * * * *